July 8, 1947.  W. A. RAY  2,423,728
ENGINE CONTROL SYSTEM
Filed Nov. 8, 1943
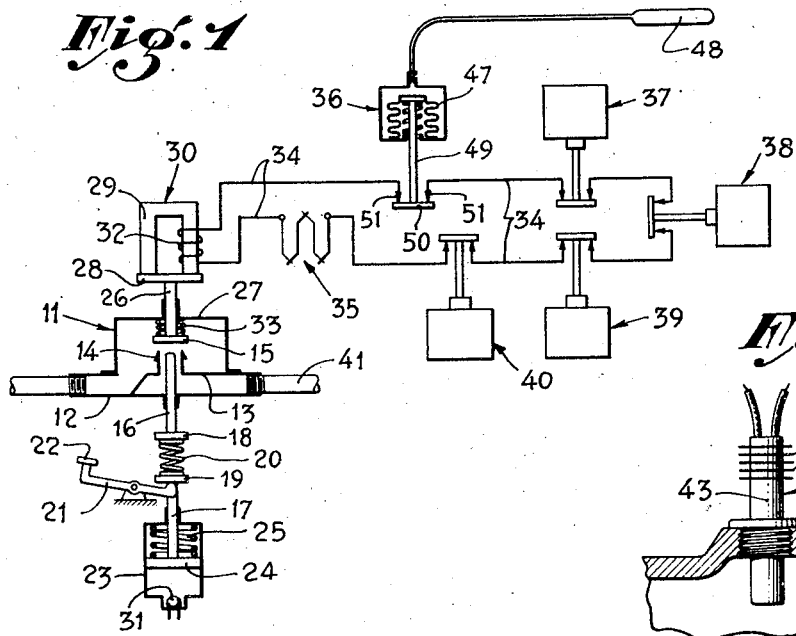
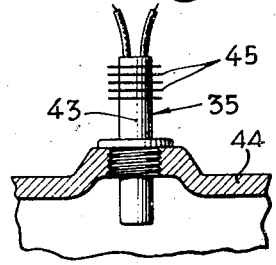
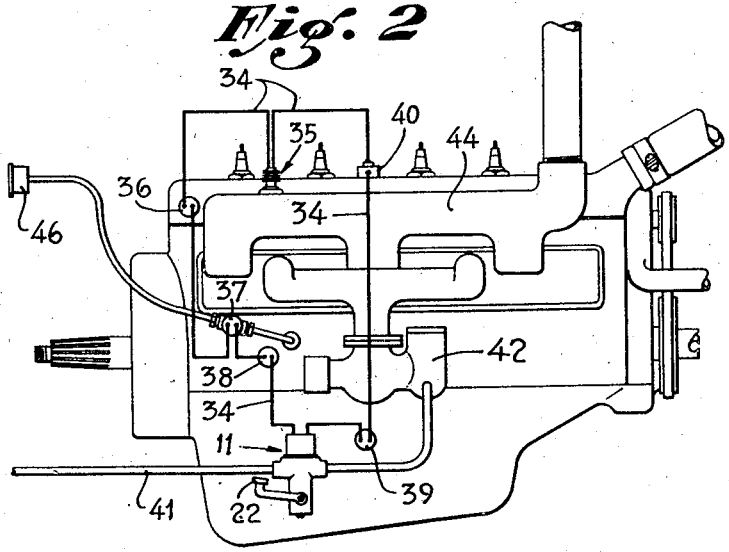
WILLIAM A. RAY,
Inventor;
By John H. Rouse,
Attorney.

Patented July 8, 1947

2,423,728

UNITED STATES PATENT OFFICE 2,423,728

ENGINE CONTROL SYSTEM

William A. Ray, Los Angeles, Calif., assignor to General Controls Co., a corporation Application November 8, 1943, Serial No. 509,455

4 Claims. (Cl. 123—198)

My present invention relates to a safety control system for engines, particularly those of the internal-combustion type which employ, as fuel, gasoline, Diesel oil, or gas. While this invention has particular utility in connection with such engines of the so-called stationary type, it will be apparent from the following description that the invention is not so limited.

A general object of the invention is the provision of means for stopping the engine in the event of the establishment of an abnormal condition of its operation—such as overheating of its cylinders, of the cylinder coolant, of the exhaust gases, of the lubricant, of the bearings, or other parts of the engine; abnormal variation of pressure of the lubricant; or excessive vibration of the engine. So that the invention can be applied to generally all types of internal-combustion engines, I prefer to effect the stoppage of the engine by shutting-off its fuel supply.

Another object is to provide, in a system of the character described, means responsive to the normal operation of the engine for generating controllable energy—such as electricity, compressed air, or a vacuum—for energizing the fuel-supply controlling means; and means responsive to the aforesaid abnormal condition of operation of the engine for so controlling said energy that the fuel supply is shut-off upon establishment of the abnormal condition. By providing the independent source of controllable energy, the invention can be applied to the control of engines which lack an equivalent source, such as an engine which employs a high-tension magneto for ignition purposes and therefore requires no storage battery or low-voltage generator.

Another object is to provide, for the control of the engine fuel, a manually-openable valve, and means energizable by the aforesaid controllable energy for normally maintaining the valve in open condition.

A more specific object is to provide an electromagnet for maintaining the valve in open condition, and a thermoelectric generating device—so arranged that it is influenced to generate energy by the heat produced by the operation of the engine—for energizing the electromagnet.

Another object is to provide means for independently maintaining the valve in open condition for an interval following the starting of the engine sufficient to permit the operation of the engine to become normal, and the energy-generating means fully effective.

Other objects and advantages of the invention will be found in the description, the drawing, and the claims; and, for full understanding of the invention, reference may be had to the following detailed description and accompanying drawing, wherein:

Figure 1 is a diagrammatic view of a control system embodying the invention;

Figure 2 is a side elevation of an internal-combustion engine, illustrating a typical application of the invention; and Figure 3 is an enlarged fragmentary section of the exhaust manifold of the engine of Fig. 2, including the thermoelectric generating device.

In the drawing, the numeral 11 generally indicates a fuel control valve comprising a casing 12 having a partition 13 providing a valve seat 14 with which a closure 15 cooperates. For actuating this closure to open position, there is provided manually-operable means comprising a first stem 16, sealingly extending through and reciprocable in an opening in the bottom wall of the valve casing, and another stem 17 axially aligned with stem 16. Between the adjacent enlarged end portions 18 and 19 of these stems is a compression spring 20, and engageable with the shoulder formed by the lower stem portion 19 is a pivoted lever 21 having at its free end a button 22 for manual actuation of the lever. The lower portion of stem 17 extends through an opening in the top wall of a compression cylinder 23 and carries a cooperating piston 24 which is downwardly biased by a spring 25 compressed between it and the top wall of the cylinder.

The valve closure 15 is attached to a stem 26 which sealingly extends through an opening in the top wall of a housing 27, covering the open top surface of the valve casing, and carries at its outer end a disk-like armature 28 which is adapted to cooperate with the U-shaped core 29 of an electromagnet 30. When stems 16 and 17 are raised by manual depression of button 22, the engagement of stem 16 with closure 15 effects upward movement of the same to a position wherein such movement is arrested by engagement of armature 28 with core 29; continued upward movement of stem 17 effecting compression of spring 20. If button 22 is now released, downward movement of stem 17 and piston 24 under the force of springs 25 and 20 is arrested (after slight initial movement) by the air trapped in the "dash-pot" formed by the portion of the cylinder below the piston, which is closed (except during upward movement of the piston) by a ball check-valve 31.

The arrangement described in the preceding paragraph constitutes a "time-delay" for the closure whereby, due to the compression of spring 20, the armature 28 is maintained in engagement with core 29 for a predetermined interval following the manual opening of the valve; the rate of leakage of air around the piston determining the length of delay. If during, and following, the interval that the armature is in engagement with the core the electromagnet 30 is energized by passage of current through its coil 32, the closure 15 will be magnetically retained in open position upon final retraction of stem 16. The electromagnet 30 is preferably of the "weak-current" type which is incapable of attracting the armature through space; such a magnet, however, being capable of supporting a weight of more than one pound with an expenditure of but 0.001 watt of electrical energy. If the electromagnet is deenergized, the armature is released and the closure falls to valve-closing position; a bias spring 33 aiding such movement.

In the diagram of Fig. 1, the electromagnet coil 32 is shown connected by wires 34 in a series circuit which includes a thermoelectric generating device 35, and a plurality of switching devices 36—40. In Fig. 2, these elements are shown mounted on an internal-combustion engine, the gasoline supply line 41 of which (leading to carburetor 42) is controlled by the valve 11 described hereinabove.

The thermoelectric generating device 35 consists of one or more thermocouples contained in a metal tube 43 and so arranged that the hot junctions of the couples are near the bottom of the tube, which is so mounted in the exhaust manifold 44 of the engine (see Fig. 3) that the device is influenced to generate energy by the heat of the exhaust gases; the cold junctions of the couples being in the exterior top portion of the tube which is provided with radiating fins 45 to facilitate cooling of those junctions.

The switching devices 36—40 are so constructed and arranged as to be responsive to various conditions of operation of the engine, the magnitude of which conditions should remain within predetermined limits for safe operation of the engine. As shown arranged in Fig. 2, the device 36 is responsive to the temperature of the engine coolant, device 37 (connected in a pipe leading to the lubricating-oil pressure-gauge 46) responsive to the oil pressure, device 38 responsive to the oil temperature, device 39 responsive to the temperature of one or more of the main bearings, and device 40 responsive to vibration of the engine. Each of these devices may be of a construction well-known and adapted for its particular purpose. For example, the device 36, as shown in Fig. 1, is a fluid-expansion thermostat comprising an expansible-contractible bellows 47 subjected to fluid pressure which varies in accordance with the temperature of a thermal bulb 48; the bellows having a stem 49 which carries a contact member 50 cooperable with fixed contacts 51.

In Fig. 1, the various switching devices 36—40 are each shown in the condition assumed during normal operation of the engine—the circuit including these devices, the generator 35, and electromagnet coil 32 being complete, so that the fuel-supply valve 11 is maintained in open condition due to the magnetic attraction of armature 28 by core 29. Upon establishment of an abnormal condition of engine operation—such as overheating of the coolant, the lubricating oil, or a bearing; oil pressure below or above normal; or excessive engine vibration due, for example, to accidental disconnection from the engine of a machine driven by it—the corresponding switching device acts to open the electric circuit so that the closure 15 is released to effect stoppage of the engine by shut-off of the fuel.

After the original cause of stoppage of the engine has been corrected, the valve 11 is manually reopened, as described hereinabove, and the engine again started; the valve being automatically maintained in open condition by the time-delay device 23—24 while the engine is being started and until operating conditions (such as rise of oil pressure) have become normal—the time-delay device being so adjusted that sufficient time is allowed for proper heating of the thermoelectric generating device, if such source of electrical energy is employed.

Upon normal stoppage of the engine, or stoppage due to causes not affecting the safety shut-off circuit, resultant cooling of the thermoelectric generating device effects deenergization of the electromagnet so that the fuel supply is then shut-off, thus eliminating the possibility of leakage of fuel in the engine.

The system herein shown and described is obviously susceptible of modification without departing from the spirit of the invention, and I intend therefore to be limited only by the scope of the appended claims.

I claim as my invention:

1. In a safety control system for an internal-combustion engine: a valve for controlling supply of fuel to said engine, means biasing said valve to closed condition, manual means for opening said valve, an electromagnet effective when energized to maintain said valve in open condition against the force of said bias only after the valve is first opened by said manual means, and a thermoelectric generating device for energizing said electromagnet and having a hot junction subjected to the heat produced by combustion in the engine.

2. In a safety control system for an internal-combustion engine: a valve for controlling supply of fuel to said engine, means biasing said valve to closed condition, manual means for opening said valve, an electromagnet effective when energized to maintain said valve in open condition against the force of said bias only after the valve is first opened by said manual means, a thermoelectric generating device for energizing said electromagnet and having a hot junction subjected to the heat produced by combustion in the engine, and a time-delay device activated by the operation of said manual means for independently maintaining said valve in open condition for an interval sufficient to permit proper heating of said thermoelectric generating device when the engine is operated.

3. In a safety control system for an internal-combustion engine: a valve for controlling supply of fuel to said engine, means biasing said valve to closed condition, manual means for opening said valve, an electromagnet effective when energized to maintain said valve in open condition against the force of said bias only after the valve is first opened by said manual means, a thermoelectric generating device for energizing said electromagnet and having a hot junction subjected to the heat produced by combustion in the engine, a circuit interconnecting said thermoelectric generating device and said electromagnet, and a device responsive to a condition necessary to the continued proper operation of the engine for so controlling said circuit that the electromagnet is deenergized when said condition becomes abnormal.

4. In a safety control system for an internal-combustion engine: a valve for controlling supply of fuel to said engine, means biasing said valve to closed condition, manual means for opening said valve, an electromagnet effective when energized to maintain said valve in open condition against the force of said bias only after the valve is first opened by said manual means, a thermoelectric generating device for energizing said electromagnet and having a hot junction subjected to the heat produced by combustion in the engine, a circuit interconnecting said thermoelectric generating device and said electromagnet, a device responsive to a condition necessary to the continued proper operation of the engine for so controlling said circuit that the electromagnet is deenergized when said condition becomes abnormal, and a time-delay device activated by the operation of said manual means for independently maintaining said valve in open condition for an interval sufficient to permit proper heating of said thermoelectric generating device when the engine is operated.

WILLIAM A. RAY.

REFERENCES CITED

The following references are of record in the file of this patent:

UNITED STATES PATENTS

| Number | Name | Date |
| --- | --- | --- |
| 2,010,960 | Pogue | Aug. 13, 1935 |
| 1,339,798 | Thompson | May 8, 1920 |
| 1,461,662 | Kawamura | July 10, 1923 |
| Re. 16,801 | Kentrup | Nov. 29, 1927 |
| 2,208,299 | Marcus | July 16, 1940 |
| 1,960,432 | Barker | May 29, 1934 |
| 1,896,459 | Mullin | Feb. 7, 1933 |
| 2,013,294 | Thibault | Sept. 3, 1935 |
| 2,210,044 | Schirokauer | Aug. 6, 1940 |

FOREIGN PATENTS

| Number | Country | Date |
| --- | --- | --- |
| 36,209 | Norway | 1922 |